3,408,345
TRISULPHONATED ANTHRAQUINONE REACTIVE DYESTUFFS SUBSTITUTED IN THE 1- AND 4-POSITIONS BY AMINE GROUPS
Hans-Samuel Bien, Burscheid, and Walter Hohmann and Heinrich Vollmann, Leverkusen, Germany, assignors to Farbenfabriken Bayer Aktiengesellschaft, Leverkusen, Germany, a corporation of Germany
No Drawing. Filed Aug. 31, 1964, Ser. No. 393,377
Claims priority, application Germany, Aug. 29, 1963, F 40,620, F 40,621
4 Claims. (Cl. 260—240)

ABSTRACT OF THE DISCLOSURE

Anthraquinone reactive dyestuffs of the formula

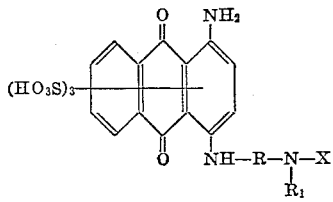

wherein R is an aromatic, hydroaromatic, or araliphatic radical; $R_1$ is hydrogen or alkyl; and X is an organic radical with at least one reactive group. The dyestuffs are particularly suitable for the dyeing and printing of hydroxyl- or amide-containing materials such as fibers and fabrics of wool, silk, synthetic polyamide, polyurethane, and natural and regenerated cellulose.

---

The present invention relates to valuable new fibre-reactive anthraquinone dyestuffs of the formula

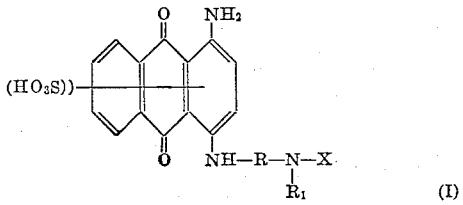

in which $n$ is a whole number greater than 2, R stands for an aromatic, hydroaromatic or araliphatic radical, $R_1$ is hydrogen or a substituent, and X stands for an organic radical with at least one reactive group.

The invention further relates to novel anthraquinone compounds of the formula

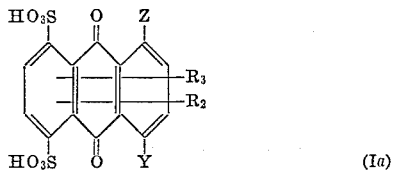

wherein Z stands for an amino or hydroxy group, Y for hydrogen, bromine or an amino or hydroxy group and $R_2$ and $R_3$ for hydrogen, halogen or a sulfonic acid group; and for a process for the manufacture of such anthraquinone sulfonic acids.

It is an object of the present invention to provide valuable novel fibre-reactive dyestuffs. A further object is the provision of highly valuable fibre-reactive dyestuffs of the anthraquinone series which are distinguished by their excellent fastness properties of the dyeings on cellulosic materials, particularly by their very good fastness to wet processing and light. Still another object is the provision of novel anthraquinone sulfonic acids, in particular those of Formula Ia. Another object is to provide a process for the manufacture of the novel anthraquinone sulfonic acids of the Formula Ia. Still another object is the provision of novel anthraquinone sulfonic acids which are valuable as starting materials for the production of dyestuffs, in particular of so-called fibre-reactive dyestuffs.

The new dyestuffs (I) are obtained in known manner by condensing appropriate starting components. By the simplest embodiment of the invention, the grouping

is converted by condensation with appropriate reactive components into the desired grouping

It is necessary in this case to use an at least bifunctional reactive component, which contains the organic radical X.

The condensation of the amino compound

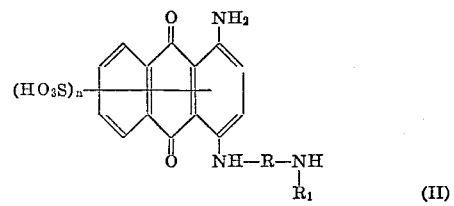

at the

nitrogen with an at least bifunctional reactive component such as a cyanuric acid halide, halogen pyrimidine or halogen quinoxaline acid halide, a halogeno phthalazine acid halide or 2-halogeno benzthiazole acid halide is performed preferably in aqueous or aqueous organic, weakly alkaline, neutral or weakly acid medium.

The term "reactive group" embraces not only reactive substituents, such as labile halogen atoms, readily splittable esterified hydroxyl groups, or activated ether or thioether groupings, but also carbon double and triple bonds which react by addition with corresponding components, e.g. with hydroxyl groups of cellulose. The organic radical X which possesses at least one reactive group can represent various radicals of the aliphatic, isocyclic or heterocyclic series. For the introduction of this radical, reactive components are suitable which possess at least two labile substituents. Examples are the following: di- or tri-halogen triazine compounds, such as di- or tri-chloro or -bromo-sym. triazine, alkyl or aryl halogen triazine compounds, halogen cyanotriazines, halogen aminotriazines, such as 1-phenylamino- or 1-sulfophenylamino-3,5-dichloro or -dibromo-sym. triazine, halogen arylthio- or halogen aryloxy triazines, halogen pyrimidines, 5-cyano-halogen pyrimidines, the halogen substituents being preferably -Cl or -Br; acyl compounds of suitable carboxylic acid and sulfonic acid halides, for example halogen fatty acid halides, such as β-chloro- or β,β-dichloro propionic acid halide, and derivatives of unsaturated aliphatic carboxylic acids, such as acrylic and methacrylic acid halides or mono-, di- or trichloroacrylic acid halides, 2,6-dichloro- or -dibromo-pyrimidine-4-carboxylic acid halides, 2,6-dichloro- or -dibromo-pyrimidine-4-sulfonic acid halides, 2,3-dichloro- or -dibromo-quinoxaline-6-carboxylic acid halides or -6-sulfonic acid halides, 1,4-dichloro- or -dibromo-phthalazine-6-carboxylic acid halides or -6-sulfonic acid halides, 2-chloro-benzthiazole-5- or -6-sulfonic acid halides or carboxylic acid halides, ethylene sulfonic acid halides and so forth. Among the acid halides the chlorides and bromides are preferred.

If the conversion leads to dyestuffs which possess more than one reactive group in the radical X or at another place of the dyestuff molecule, these can be replaced in part by other radicals, for example by amino radicals which themselves can have reactive groups, e.g. in the form of esterified hydroxyalkyl groups. In principle the presence of two or more reactive groups different from one another is possible.

According to another variant of this process of production it is also possible in several cases to proceed by condensing 1-amino-4-bromo-anthraquinone-trisulfonic acids, e.g. 1 - amino-4-bromo-anthraquinone-2,5,8-trisulfonic acid, with aromatic, hydroaromatic or araliphatic diamines which already contain the reactive radical X, i.e. with compounds

wherein R, $R_1$ and X have the meaning given above.

Starting components of the Formula II can be produced by reacting diamines of the formula

wherein R and $R_1$ have the meaning given above, with 1-amino-4-bromo-anthraquinone trisulfonic acids. The 1-amino-4-bromo-anthraquinone trisulfonic acids V are obtainable if halogen atoms standing in α-position in optionally further substituted anthraquinones, which are substituted in the 1- and/or 4-position by amino or hydroxy groups and in the 5- and 8-position by chlorine, are exchanged for sulfonic acid groups by heating with salts of sulfurous acid, and the compounds obtained further brominated, if desired.

The reaction for the production of the Compounds V takes place advantageously in aqueous solution or suspension at elevated temperature, e.g. at about 70–110° C. or higher temperatures with the use of somewhat more than the theoretical amount of sulfites or bisulfites. The process can be carried out in an especially simple manner in aqueous solution if the starting compounds already contain one or more sulfonic acid groups. The anthraquinone sulfonic acids obtained which are very readily soluble in water can be isolated as readily crystallising sodium or potassium salts after the reaction has ended.

Starting materials which may be used for the preparation of the Compounds V are, for example, 1-amino-5,8-dichloro-anthraquinone-2-sulfonic acid,
1-amino-5,6,7,8-tetrachloro-anthraquinone-2-sulfonic acid,
1-amino-4-bromo-anthraquinone-5,8-dichloro-2-sulfonic acid,
1-amino-anthraquinone-4,5,8-trichloro-anthraquinone-2-sulfonic acid,
1,4-diamino-5,8-dichloro-anthraquinone-2-sulfonic acid or
1-amino-4-hydroxy-5,8-dichloro-anthraquinone-2- or -3-sulfonic acid,
1,4-dihydroxy-5,8-dichloro-anthraquinone-2-sulfonic acid,
1-hydroxy-5,8-dichloro-anthraquinone-2-sulfonic acid,
1-amino-5,8-dichloro-anthraquinone-2,4-disulfonic acid
or the same compounds without sulfonic groups.

The process for the manufacture of the Compounds V can also be performed in several steps by first reacting part of the halogen atoms and then a further part. The sulfiting can be carried out either in aqueous medium or in solvents optionally miscible with water, e.g. glycol, glycol ethers or alcohols, with or without the addition of dispersing agents. The progress of the reaction can be well followed chromatographically. The further bromination can take place in a manner known as such, e.g. in hydrochloric acid or sulfuric acid, optionally in the presence of halogenation catalysts.

The condensation of the Compounds II with the at least bifunctional reactive compounds proceeds expediently in an aqueous alkaline medium.

An especially suitable amino-anthraquinone tri-sulfonic acid for the preparation of the novel dyestuffs I is 1-amino - 4-bromo-anthraquinone-2,5,8-trisulfonic acid. As aromatic, hydroaromatic and araliphatic diamines the following may be used for the condensation, inter alia:

1,4-diaminobenzene,
1,3-diaminobenzene,
1,4-diaminohexa-hydrobenzene,
4,4'-diamino stilbene-3,3'-disulfonic acid,
1,3-diaminobenzene-4-sulfonic acid,
1,4-diaminodiphenyl-3,3'-disulfonic acid,
1,4-diaminodiphenyl-2,2'-disulfonic acid,
4,4'-diminodiphenylamine-3'- or -2,2'-disulfonic acid,
1-amino-3- or -4-methylaminobenzene,
1-(4'-aminophenyl)-ethylamine-(2),
1-(o-, m- or p-aminophenyl)-propyl-N-methyl-amine-(3),
1-(3'-aminophenyl)-butyl-N-methylamine-(3) and
N-(4'-aminophenylmethyl)-N-methylamine.

The new dyestuffs are suitable for the dyeing and printing of hydroxyl or amide group-containing materials, such as textile fibres, threads and fabrics of wool, silk, synthetic polyamide and polyurethane fibres and especially for the wash-fast dyeing and printing of natural and regenerated cellulose, fixation being expediently brought about by treatment with acid-binding agents and optional heat treatment according to processes known for reactive dyestuffs.

The following examples are given for the purpose of illustrating the invention.

EXAMPLE 1

6 grams 1 - amino-4-(4'-aminophenylamino)-anthraquinone-2,5,8-trisulphonic acid are dissolved at 40° C. as the sodium salt in 180 ml. of water, the solution is adjusted to pH 8 and 2.7 g. 2,3-dichloroquinoxaline-6-carboxylic acid chloride are introduced in small portions at 40–45° C. A dilute caustic soda solution is simultaneously added dropwise so that a pH of 7.5–8.5 is maintained during the reaction. Stirring is continued at 40–45° C. until all starting material has disappeared, the reaction mixture is filtered off from excess quinoxaline carboxylic acid chloride and salted out at 40° C. with a sufficient quantity of solid chloride that an approximately 10% sodium chloride solution is formed. After filtering off with suction and washing with a small amount of a common salt solution, the resulting dyestuff of the formula

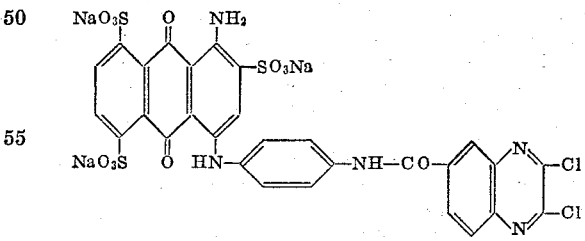

is dried in vacuum below 40° C. About 8.5 g. of the dyestuff are obtained in the form of blue-green needles.

The dyestuff dyes cotton according to processes usual for reactive dyestuffs in strong blue-green shades of good fastness to wet processing and light.

If the 1 - amino - 4-(4'-aminophenylamino)-anthraquinone-2,5,8-trisulphonic acid is reacted with 2,3-dichloroquinoxaline-6-sulphonic acid chloride instead of 2,3-dichloroquinoxaline-6-carboxylic acid chloride, a dyestuff is obtained which yields on cotton substantially bluer shades.

The 1 - amino - 4-(4'-amino-phenylamino)-anthraquinone-2,5,8-trisulphonic acid used as starting material is obtained as follows: 31.2 g. p-phenylene diamine are introduced under nitrogen into a solution of 62 g. 1-amino - 4 - bromo - anthraquinone-2,5,8-trisulphonic acid sodium salt and 12 g. soda in 400 ml. of water, and stirred with addition of a CuCl paste at 40° C. until no more disulphated bromo-amine acid can be detected. The solution is then treated with dilute hydrochloric acid, the precipitated dyestuff is filtered off with suction, washed with dilute hydrochloric acid, mixed in 300 ml. water with a sufficient amount of a dilute sodium hydroxide solution that dissolution just takes place, and the dyestuff precipitates while warm as the sodium salt; the product is then washed and dried.

EXAMPLE 2

7 grams 1-amino-4-(3'-aminophenylamino)-anthraquinone-2,5,8-trisulphonic acid sodium salt are dissolved in 200 ml. of water and mixed with a solution of 3.5 g. 2,3-dichloroquinoxaline-6-carboxylic acid chloride in 20 ml. of acetone, at 40° C. and at a pH of 7.5-8.5 in the course of 20 minutes. When all starting material has disappeared, the solution is freed from excess quinoxaline carboxylic acid chloride, mixed with 8 g. sodium chloride at 40° C., the resulting precipitate is filtered off with suction, washed and dried in vacuum at 40° C. There are obtained 11 g. of a blue product with 17% NaCl content, corresponding to 96% of the theoretical.

By methods customary for fixing dyestuffs, the dyestuff dyes cotton in fast greyish blue shades.

EXAMPLE 3

To a solution of 5 g. 1-amino-4-(4'-aminophenylamino)-anthraquinone-2,5,8-trisulphonic acid sodium salt in 100 ml. of distilled water, there is added at 0-5° C. rapidly a cold solution of 1.45 g. cyanuric chloride in 15 ml. of acetone; the pH is simultaneously maintained at 4-6 by the portionwise addition of a dilute caustic soda solution. The cyanuric chloride reacts very rapidly. When the reaction is completed, the mixture is clarified, a mixture of 1 g. $Na_2HPO_4$ and 2 g. $KH_2PO_4$ is added as buffer, and salting out is carried out with common salt at 30° C. The well shaped green needles obtained are filtered off with suction at room temperature and washed with a buffer consisting of 15 g. NaCl, 1.5 g. $Na_2HPO_4$ and 3 g. $KH_2PO_4$ in 100 ml. water, thoroughly squeezed and dried.

The dyestuff dyes cotton by the reactive dyestuff process in the cold from long baths in very fast intense blue-green shades.

EXAMPLE 4

22.4 grams 4,4'-diaminostilbene-disulphonic acid-(2,2') are dissolved in 80 ml. of water with the addition of the amount of concentrated caustic soda theoretically required for the formation of the disodium salt. To this solution are added 4 g. sodium bicarbonate and 12.2 g. disulphated bromoamine acid as well as a small amount of a cuprous chloride paste, and the solution is stirred at 70-75° C. until no further reaction occurs. Salting out is performed with 30 g. sodium chloride, and the dyestuff is filtered off with suction in the cold. The product obtained is freed from 4,4'-diaminostilbene-disulphonic acid by redissolving the sodium salt several times. 5 grams of the resulting product of the formula

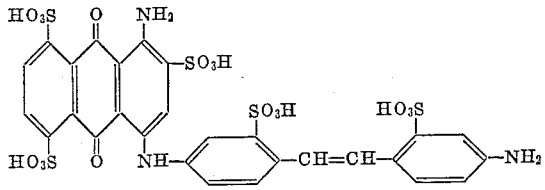

are dissolved at 45° C. in 200 ml. of water and acylated with 2.5 g. 2,3-dichloroquinoxaline-6-carboxylic acid chloride with the addition of some acetone until only traces of the starting material are still present. After salting out with 20 g. of common salt at 40° C., the small green needles of the dyestuff are filtered off with suction and washed with a common salt solution. A green crystalline powder is obtained as dyestuff which is very readily soluble in water and dyes cotton according to reactive dyestuff methods in strong bluish green shades of good fastness properties.

EXAMPLE 5

8 grams 1-amino-4-(4'-aminocyclohexylamino)-anthraquinone-2,5,8-trisulphonic acid are dissolved in 200 ml. of water, and a solution of 4 g. 2,3-dichloroquinoxaline-6-carboxylic acid chloride in 35 ml. of acetone is added at 45° C., and the hydrochloric acid resulting from the reaction is neutralised in the usual way with a dilute caustic soda solution. The amino group on the hydroaromatic nucleus is rapidly acylated, and after working it up in the usual way as the sodium salt, 8.5 g. of a blue dyestuff powder are obtained, which dyes cotton from a long bath at 40° C. with the addition of a soda solution in very clear reddish blue shades. The dyestuff is eminently suitable for printing cellulose materials.

EXAMPLE 6

7 grams of the reaction product from 1-amino-4-bromoanthraquinone-2,5,8-trisulphonic acid and p-aminobenzyl-(N-methyl)-amine of the formula

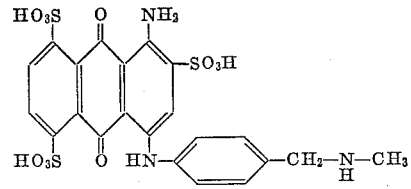

are dissolved in 200 ml. of water, and this solution is slowly mixed at 45° C. with a concentrated solution of 3.2 g. 2,3-dichloroquinoxaline-6-carboxylic acid chloride in acetone, and a sufficient amount of a caustic soda solution is added so that the pH value does not fall below 8. When only traces of starting material are observable chromatographically the solution is clarified and salted out at 30° C. with 30 g. sodium chloride. The resulting precipitate is filtered off in the cold, washed with a common salt solution and dried. The dyestuff obtained dyes cotton from a long bath in greyish blue shades.

EXAMPLE 7

(a) 30 grams 1-amino-5,8-dichloro-anthraquinone-2-sulphonic acid sodium salt, obtained by sulphonation of 1-amino-5,8-dichloro-anthraquinone with chlorosulphonic acid in nitrobenzene, are suspended in 400 ml. water and mixed at 90-95° C. with a solution of 40 g. sodium sulphite in 100 ml. water and boiled under reflux until no more starting material can be detected; this is the case after about 2 hours.

Sufficient solid NaCl is added to the warm clear yellow-brown solution that an approximately saturated common salt solution is present and this is stirred in the cold. The sodium salt of the trisulphonic acid separates rapidly in the form of compact bright orange prisms, which are filtered off with suction at 20° C., washed with a saturated common salt solution and dried in vacuum. 37.1 grams are obtained (92.5% of the theoretical). The substance possesses a sulphur content of 17.7% and contains no organically bound chlorine. When the sodium salt is dissolved in 80% $H_2SO_4$, the acid concentration reduced with water to about 30%, and the precipitated broad needles filtered off with suction and washed with glacial acetic acid and methanol till free of sulphuric acid, the orange coloured free 1-amine-anthraquinone-2,5,8-trisulphonic acid is obtained. It dissolves very readily in water with a reddish yellow colour. The colourless solution in $H_2SO_4$ is coloured in an intensive blue by the addition of formaldehyde.

(b) 180 parts 1-amino-anthraquinone-2,5,8-trisulphonic acid sodium salt are dissolved in 1100 parts of water and mixed with 60 parts of common salt. A solution of 1 part iodine in 50 parts by volume of semi-concentrated hydrochloric acid is then added with stirring, and a solution of 45 parts bromine in 450 parts by volume 17% hydrochloric acid is allowed to run in within 2 hours at a temperature of 0–3° C. Further bromine is then added in small portions with continuous chromatographic control, until only a trace of starting material can be detected, but not yet any amino-dibromo-anthraquinone-disulphonic acid. An excess of bromine is to be avoided, since otherwise $SO_3H$ groups will also be exchanged for bromine.

Stirring is continued for 30 minutes, 250 parts of common salt are added portionwise, residual bromine is removed with some bisulphite solution (ca. 0.5 part by volume required), followed by further stirring for 30 minutes, and the separated bromination product is filtered off with suction at 10° C., covered with a little saturated common salt solution and rapidly pressed off.

The filter cake is then stirred to a thick pulp in a 20% common salt solution, neutralised with solid sodium bicarbonate, filtered off with suction, washed with a saturated common salt solution and dried in vacuum.

200 parts of 1-amino-4-bromo-anthraquinone-2,5,8-trisulphonic acid sodium salt are obtained in the form of bright orange-red prisms.

EXAMPLE 8

(a) 5 grams 1-amino-5,8-dichloro-anthraquinone-2-sulphonic acid are suspended in 95 ml. water, mixed with 25 g. 40% Na-bisulphite solution and 2 ml. 30% caustic soda and boiled under reflux until no more starting material is present.

After working up as described in Example 7(a), 6.1 grams (92% of the theoretical) of 1-amino-anthraquinone-2,5,8-trisulphonic acid are obtained as the Na-salt.

(b) 15 parts 1-amino-anthraquinone-2,5,8-trisulphonic acid sodium salt are dissolved in 90 parts of water and mixed at 5° C. with vigorous stirring, in one portion with 15 parts of common salt. The sodium salt of the trisulphonic acid separates in finely divided form. A solution of 0.1 g. iodine in 5 parts semi-concentrated hydrochloric acid is added to the thick pulp and a solution of 4.5 parts of bromine in 45 parts by volume 17% hydrochloric acid is added dropwise at a constant rate within one hour at 0–3° C.

When about half the amount of bromine solution is added, the initially dark brown-red suspension is transformed to an increasing extent into long bright orange-red needles, the reaction mixture becoming thinly liquid. Stirring is continued for an hour at 0–5° C. to complete the reaction, the material is filtered while cold, washed with a cold saturated common salt solution until neutral, and dried. 15.5 parts of 1-amino-4-bromo-anthraquinone-2,5,8-trisulphonic acid are obtained in the form of the sodium salt.

(c) 16.2 parts of 1-amino-anthraquinone-2,5,8-trisulphonic acid sodium salt are dissolved in a mixture of 120 parts by volume of sulphuric acid monohydrate, 40 parts by volume of 20% oleum and 1.5 parts of sodium sulphate, and 0.2 part of iodine are added, and the mixture is gradually treated in the cold with 2.5 parts of bromine. The mixture is then heated to 65° C. within an hour and maintained at this temperature, until only a little starting material can still be detected in a processed sample.

After diluting slowly below 45° C. with water to 50% acid, the 1-amino-4-bromo-anthraquinone-2,5,8-trisulphonic acid which separates in almost colourless needles is filtered off with suction, washed with 40% $H_2SO_4$, then with glacial acetic acid and methanol and dried at 60° C. in vacuum. 11.2 parts are obtained.

EXAMPLE 9

(a) 30 grams 1-amino-5,6,7,8-tetrachloro-anthraquinone-2-sulphonic acid, obtained by sulphonation of 1-amino-5,6,7,8-tetrachloro-anthraquinone in nitrobenzene with chlorosulphonic acid, are boiled under reflux in 500 ml. water with 200 ml. of a 40% sodium bisulphate solution with addition of some dispersing agent until an almost clear solution results and no more starting material can be detected chromatographically. The solution is clarified from a slight cloudiness, mixed with NaCl to saturation and stirred in the cold, finally in an ice bath. The separated orange-yellow needles are filtered off with suction, washed with a saturated NaCl solution and methanol, and dried.

The substance obtained contains 11.5% chlorine and 15.4% sulphur. Consequently, the sodium salt of a dichloro-amino-anthraquinone-trisulphonic acid is present, presumably of 1 - amino - 6,7 - dichloro - 2,5,8 - trisulphonic acid, since in a test the chlorine atom in 1-amino-6,7-dichloro-anthraquinone-2-sulphonic acid could not be exchanged under the reaction conditions applied.

35 parts of 1-amino-6,7-dichloro-anthraquinone-2,5,8-trisulphonic acid sodium salt are dissolved in 350 parts of water, this solution is mixed with 10 parts of common salt and a solution of 0.3 part of iodine in semiconcentrated hydrochloric acid, and then mixed at 0–2° C. in the course of one hour with a solution of 8.5 parts of bromine in 85 parts by volume of semi-concentrated hydrochloric acid. After a short time the precipitation of needles takes place. Stirring is continued for one hour, followed by neutralisation below 5° C. with sodium bicarbonate, the material is filtered off with suction, washed with a saturated NaCl solution, then with some methanol, and dried in vacuum. 26.5 parts of 1-amino-6,7-dichloro-4-bromoanthraquinone-2,5,8-trisulphonic acid sodium salt are obtained.

EXAMPLE 10

4 grams 1-amino-4-bromo-5,8-dichloro-anthraquinone-2-sulphonic acid sodium salt, obtained by sulphonation of 1-amino-5,8-dichloroanthraquinone with chlorosulphonic acid in nitrobenzene at 130° C., followed by bromination in aqueous hydrochloric acid, are boiled under reflux in 60 ml. water with addition of 6 g. $Na_2SO_3$ and 0.2 g. dispersing agent until a clear solution results and no starting material can be detected any longer. A sufficient amount of common salt is added to this hot yellow coloured solution that an approximately saturated common salt solution results. 1-amino-anthraquinone-2,4,5,8-tetrasulphonic acid sodium salt separates out at once in beautiful broad needles which are filtered off with suction, washed with common salt solution and dried. Yield 4.3 g.

The almost colourless solution in concentrated $H_2SO_4$ changes to violet on addition of formaldehyde. The acid dissolves in water with a much yellower colour than 1-amino-anthraquinone-2,5,8-trisulphonic acid, and is insoluble in methanol.

The same tetrasulphonic acid is obtained by sulphiting 1-amino-4,5,8-trichloro-anthraquinone - 2-sulphonic acid with sodium sulphite. It is also formed, besides 1-amino-anthraquinone-4,5,8-trisulphonic acid, when sulphiting a paste of 1-amino-4,5,8-trichloro-anthraquinone with addition of dispersing agents and organic solvents.

EXAMPLE 11

5 grams 1-amino-5,8-dichloro-anthraquinone are made up as a paste with addition of 0.3 g. dispersing agent and 10 g. $Na_2SO_3$ with 100 ml. of a mixture of 30% diglycol ether and water and heated in an autoclave while slowly raising the temperature from 120 to 140° C., until a chromatographed sample shows only traces of starting material. As the main substance a 1-amino-anthraquinone-trisulphonic acid has been formed besides 1-amino-anthraquinone-5,8-disulphonic acid. By fractional salting out the trisulphonic acid can easily be separated from the disulphonic acid.

By chromatography it was found to be identical with the 1-amino-anthraquinone-2,5,8-trisulphonic acid from Examples 7(a) and 8(a). Thus, apart from the exchange of the halogen atoms, a sulphonic group has entered into the o-position to the amino group.

EXAMPLE 12

A mixture of 25 g. of a 40% sodium hydrogen sulphite solution and 95 ml. water are neutralised with caustic soda until phenolphthalein paper just turns red. 5 grams 5,8-dichloroquinizarine are then introduced, followed by 50 ml. glycol monomethyl ether. The reaction mixture is then boiled for 20 hours under reflux. A violet coloured solution results which is diluted with 200 ml. water. By salting out with 50 g. ammonium chloride and then redissolving in water, a halogen-free quinizarine sulphonic acid is obtained which contains a sulphonic group in each of the 5- and 8-positions.

EXAMPLE 13

If using in the process described in Example 1 instead of 2,3-dichloroquinoxaline-6-carboxylic acid chloride the equivalent amount of one of the following reactive components and carrying out the process in substantially the same manner or in a manner similar to that described in Example 2, fibre-reactive dyestuffs are obtainable which exhibit same or nearly same shade and yield, when dyed on cellulosic materials in the presence of alkali fast dyeings having excellent general properties in particular very good fastness to light and to wet processing:

2,3-dichloroquinoxaline-6-sulphonylchloride,
2,6-dichloro-4-p-, -m- or -o-sulphophenylamino-triazine-1,3,5,
2,6-dichloro-4-amino-triazine-1,3,5,
2,6-dichloro-4-methoxy-triazine-1,3,5,
2,4,5,6-tetrachloro-pyrimidine-1,3,
trichloro-pyrimidine,
1,4-dichloro-phthalazine-6-carboxylic acid chloride and -sulphonic acid chloride,
2-chlorobenzthiazol-6-carboxylic acid chloride and -sulphonic acid chloride,
2-chlorobenzthiazol-5-carboxylic acid chloride and -sulphonic acid chloride,
acrylic acid chloride,
monochloro-, dichloro- and trichloro-acrylic acid chloride,
ω-chloro-propionylchloride.

We claim:
1. The dyestuff of the formula

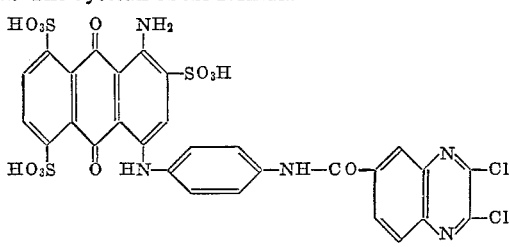

2. The dyestuff of the formula

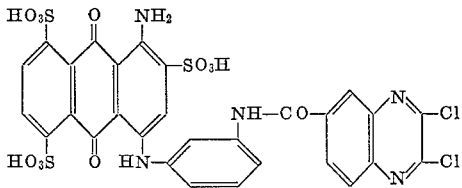

3. The dyestuff of the formula

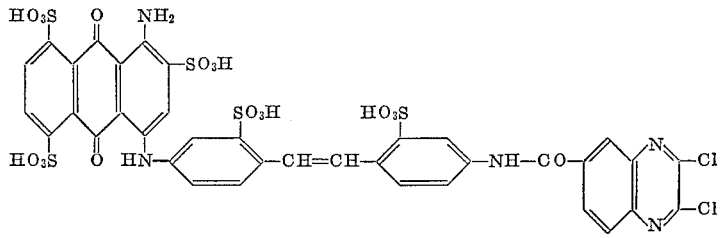

4. Reactive anthraquinone dyestuff of the formula wherein R stands for a member selected from the class consisting of substituted or unsubstituted divalent radicals of benzene, methylenebenzene, hexahydrobenzene, diphenyl, stilbene, and diphenylamine; $R_1$ is hydrogen or lower alkyl; Y is carbonyl or sulfonyl; and Z is chlorine or bromine.

References Cited

UNITED STATES PATENTS

| | | | |
|---|---|---|---|
| 3,065,191 | 11/1962 | Heslop et al. | 260—249 XR |
| 3,133,921 | 5/1964 | Brassel et al. | 260—249 |
| 3,254,084 | 5/1966 | Fleischauer et al. | 260—249 |

FOREIGN PATENTS

| | | |
|---|---|---|
| 696,492 | 10/1964 | Canada. |
| 874,508 | 8/1961 | Great Britain. |
| 952,892 | 3/1964 | Great Britain. |

OTHER REFERENCES

Manabe et al.: Yuki Gosei Kagaku Kyokai Shi, vol. 18, pp. 395–400 (1960).

JOHN D. RANDOLPH, *Primary Examiner.*

Washington, D.C. 20231

UNITED STATES PATENT OFFICE
CERTIFICATE OF CORRECTION

Patent No. 3,408,345                                                     October 29, 1968

Hans-Samuel Bien et al.

It is certified that error appears in the above identified patent and that said Letters Patent are hereby corrected as shown below:

Column 1, line 40, "$(HO_3S)$" should read -- $(HO_3S)_n$ --. Column 4, line 15, "4,4'-diminodiphenylamine-3'-" should read -- 4,4'-diaminodiphenylamine-3,3' --; line 46, after "solid" insert -- sodium --. Column 6, line 69, "1-amine-anthraquinone-" should read -- 1-amino-anthraquinone --. Column 8, line 17, "35 parts" should read -- (b) 35 parts --.

Signed and sealed this 17th day of March 1970.

(SEAL)
Attest:

Edward M. Fletcher, Jr.                            WILLIAM E. SCHUYLER, JR.
Attesting Officer                                             Commissioner of Patents